April 16, 1957 C. E. ARNOLD 2,789,210
MIXING CIRCUIT FOR MICROWAVE FREQUENCIES
Filed Dec. 30, 1952
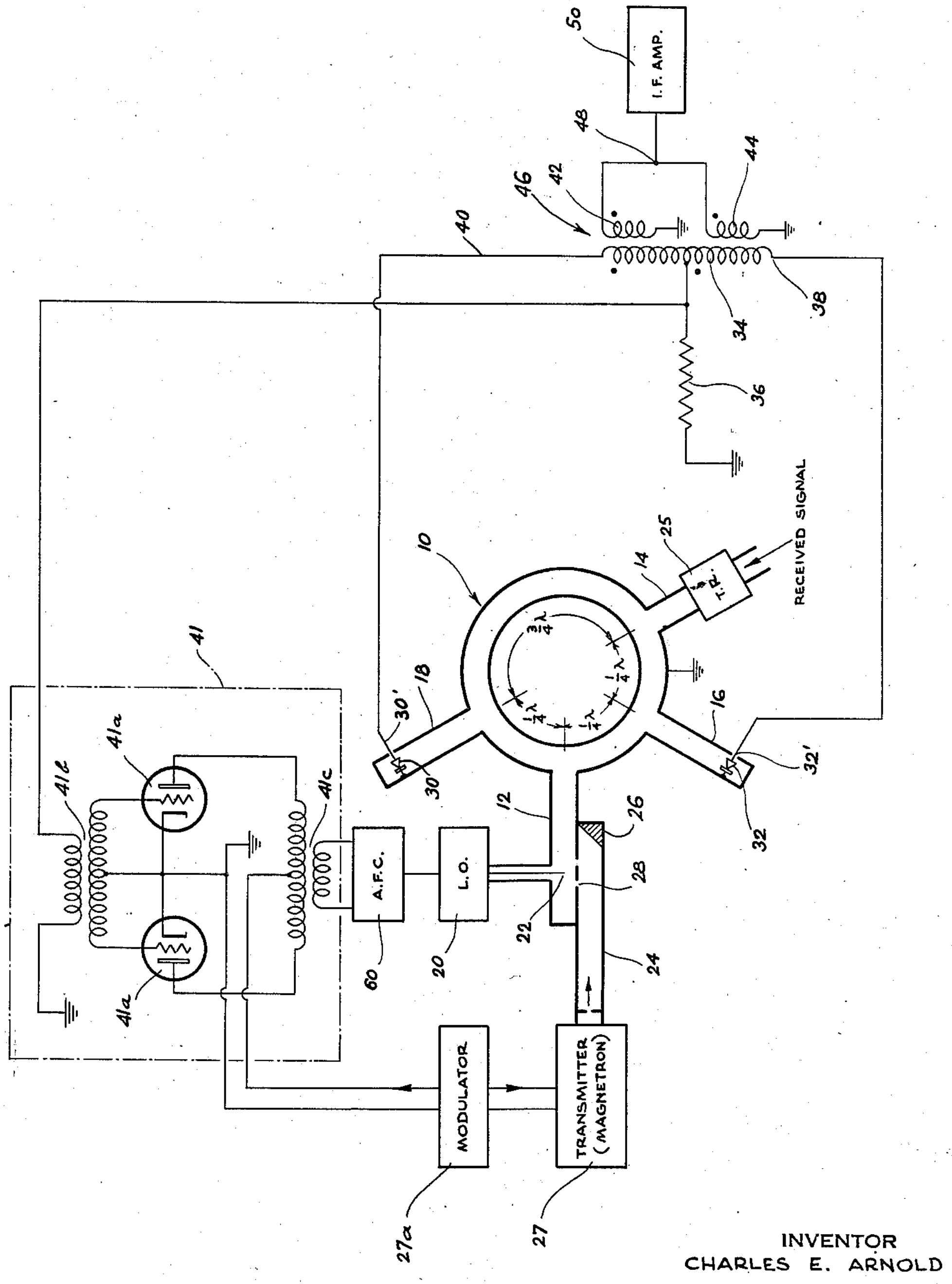
INVENTOR
CHARLES E. ARNOLD
BY Paul S Martin
ATTORNEY United States Patent Office 2,789,210

Patented Apr. 16, 1957

2,789,210

MIXING CIRCUIT FOR MICROWAVE FREQUENCIES

Charles E. Arnold, Milton, Mass., assignor to Sylvania Electric Products Inc., a corporation of Massachusetts Application December 30, 1952, Serial No. 328,747

7 Claims. (Cl. 250—13)

The present invention relates to radio systems, and particularly to mixers for combining signals in the microwave region of the radio spectrum. This invention contemplates a system for mixing three signals in pairs in a single mixing network. For example, in the embodiment detailed herein, a mixer is provided for combining a received signal with a local oscillation and for mixing the local oscillation with a sample of a transmitter signal, both in the single waveguide mixer network. This produces a heterodyne received signal for the usual intermediate frequency stages of a superheterodyne receiver and a separate and distinct transmitter monitoring signal. This latter is useful as a correction signal for automatically controlling the frequency of the local oscillator.

In combined transmit-receive systems, notably in a microwave radar system employing a superheterodyne receiver, it is a well known expedient to automatically adjust the frequency of the local oscillator to eliminate tuning errors caused by frequency drift of the transmitter and local oscillator. Since any frequency drift of the local oscillator or of the transmitter is accompanied by a corresponding change in the intermediate frequency of the radar receiver, automatic frequency control is needed. Control is usually effected by beating the local oscillation and a sample of the transmitter signal, and from the beat of these signals deriving a frequency-error or monitoring signal which may be applied to correct the frequency of the local oscillator. At microwave frequencies, it is customary to use waveguides for signal transmission. Accordingly, the prevalent practice is to feed the received signal and local oscillations to a hybrid wave guide junction containing a pair of crystal mixers arranged to yield a proper heterodyne signal for the intermediate frequency stages of the signal receiver. The transmitter sampling signal is commonly beat with the local oscillator signal in a similar but separate waveguide mixer.

The present invention contemplates a single novel waveguide mixer for heterodyning a received signal and a transmitter sample severally with local oscillations and for deriving both the receiver I. F. signal and the monitoring signal. More broadly stated, it is an object of this invention to provide a novel unitary mixing system from which two heterodyne output signals can be separately derived.

In accordance with one aspect of the present invention, a local oscillator signal is applied together with a transmitter sampling signal to a pair of crystal detectors or the like in two output arms of a hybrid waveguide junction, with a predetermined phase of these signals as compared at the detectors. The received signal is applied to the crystals by the hybrid waveguide junction, the relative phase of the received signal at the two crystals being opposite that of the phase relationship established for the local oscillator and the transmitter signals at the crystals. In order to derive a signal for the purposes of frequency control, a parallel-fed intermediate frequency coupling circuit is arranged between the crystal diodes. As to the heterodyned received signal, out-of-phase and self-canceling in the parallel output coupling circuit, a push-pull output circuit is provided. In this circuit the heterodyne output of the oscillator and transmitter sampling signals is self-canceling, as is true, too, of noise in either of these signals that might otherwise enter the receiver heterodyne circuit.

As applied to a radar set, this invention makes possible the use of a single waveguide mixer for deriving both the received signal and a frequency monitoring signal. In such pulse systems, these two beat signals are derived at different times; and means is also provided for rendering the frequency monitor effective only during transmitter pulses.

The nature of the invention and its further features of novelty will be more fully appreciated from the following detailed description of an illustrative embodiment shown in the accompanying drawing which is a somewhat schematic circuit diagram.

In the drawing, there is shown a novel combined automatic frequency control and received-signal detector in a superheterodyne radar receiver that is otherwise of conventional design, which includes a hybrid waveguide junction 10 of the so-called "rat-race" type having two input arms 12, 14 and two output arms 16, 18. The body of the hybrid junction 10 is a closed ring or loop of waveguide effectively one and one-half wave lengths in mean circumference with the respective arms connected to the ring as indicated in accordance with well understood practices relating to coupling of radio frequency energy to and from hybrid junctions. The frequencies involved are sufficiently close to each other to consider the waveguide dimensions equally effective as to all the microwave signals. A source of local oscillation from an oscillator 20 is applied to arm 12. For example, the oscillator may be a reflex klystron tunable by changing the direct-current voltage on its repeller grid or thermally tuned by an applied frequency-control voltage, or any other suitable conventional arrangement may be used. The energy from the oscillator 20 is coupled to the waveguide input arm 12 by means of a probe 22. A sampling signal derived from the transmitter 27, such as a magnetron, is applied to the same arm 12 for the ultimate purpose of eliminating tuning errors caused by frequency drifts of the transmitter and the local oscillator of the radar system. The transmitter sampling signal is coupled to the input arm 12 by a length of waveguide 24 having a properly matched termination 26 and a unidirectional and attenuating coupler 28, illustrated as a conventional two-hole coupler. The relationship illustrated for couplers 22 and 28 with waveguide arm 12 is strictly diagrammatic.

The received signal is applied to the other input arm 14 of the hybrid junction in accordance with well understood techniques, through T–R switch tube or duplexer 25. As is well understood the T–R tube becomes a short-circuit during high level bursts from the magnetron that is commonly connected by waveguides (not shown) to the same antenna and waveguide system used for transmission and reception.

In the output arms 16, 18 there are provided a pair of point-contact crystal rectifiers, 30, 32 coupled in a conventional manner to the respective waveguide sections 16, 18. The input arm 12 is so spaced relative to the output arms 16, 18, that the output signals of the local oscillator 20 are distributed in two paths by the "rat-race" 10 and applied in phase to the two diodes 30, 32; and the output signals from the transmitter are divided in two paths, and also appear in phase at the diodes. In contrast the received signal energy fed to the input arm 14 is divided into two signal paths that are applied by the hybrid junction to the diodes 30, 32 in mutually out-of-phase relation, by proper spacing of the arm 14 from those output arms.

Like terminals 30′, 32′ of the point-contact rectifiers are connected to the opposite terminals 38, 40 of winding 34 of a transformer which is center-tapped. This center tap is connected to a load impedance 36 having its opposite terminal grounded and, as shown, the opposite rectifier terminals are also grounded and are thus connected to resistor 36.

The heterodyne energy resulting from the beat of the received signal and the local oscillation appears out-of-phase at the opposite terminals 38, 40 of the center-tapped winding 34 and accordingly the heterodyne signal energy in the winding 34 is repeated in parallel secondary windings 42, 44. None of this appears across load impedance 36. With respect to the heterodyne signal resulting from the beat of the local oscillation and the transmitter sampling signal, the two halves of the coil 34 operate in parallel and have mutually canceling fields and they act to deliver this heterodyne energy to the load impedance 36. The latter serves to derive output for the purpose of frequency control. Any frequency drift of the carrier or local oscillator causes the intermediate frequency to change by the same amount, thereby producing a voltage at the load impedance 36 which, after amplification, and measurement in a frequency discriminator may be utilized for control at the repeller of a reflex klystron oscillator to retune it to the correct frequency.

The automatic frequency control has been designated by the block 60, shown connected in control relation to the local oscillator 20. This control is effected by the signal across resistor 36 through a gating circuit 41 that operates only when pulse modulator 27*a* of the magnetron is effective to energize the magnetron 27. The arrangement includes push-pull triodes 41*a* with input push-pull transformer 41*b* and push-pull output transformer 41*c*, the anodes of these triodes being energized by modulator 27*a*. Since automatic frequency controls are well known in the art, a detailed description of the frequency discriminator etc. contained in unit 60 is omitted in the interests of simplicity and clarity of the present disclosure. It is well understood that either thermal or mechanical tuning may be used for the local oscillator 20.

With respect to the out-of-phase heterodyne signal, the energy appearing at the opposite terminals 38, 40 of the centertapped coil 34 serves as the primary of an intermediate frequency coupling transformer 46, having secondary coils 42, 44 properly phased and having a common connection 48 at which the heterodyne received signal energy appears in phase. There is virtually no absorption of this heterodyne energy in resistor 36. This energy may be fed to the intermediate frequency amplifier 50, and to conventional utilization devices of the receiver. The noise components of the local oscillator appear out-of-phase at the heterodyne output circuit and tend to be self-cancelling, an attribute of the mixer shown omitting coupler 28 and resistor 36. It is common to find in the waveguide arm 14 numerous signals, originating especially from nearby radars, perhaps operating at a frequency near that of the magnetron 27. The rat-race 10 and the detector circuit shown serves to suppress possible confusion that might be caused if a spurious signal were to enter arm 14, since such signal heterodyned does not appear across impedance 36. This effect of isolation is enhanced by gating the automatic frequency control channel 60, so as to render that channel effective only during the transmitter pulses. This gating process has the effect of examining the signal at impedance 36 only when that signal is synchronized with the pulses from magnetron 27. Furthermore, unit 41 transmits the frequency control signal at a time when the T–R switch 25 blocks arm 14. When the T–R tube is open, there can be no desired frequency control signal at impedance 36, and any spurious signal at this point is suppressed by the gate 41.

From the foregoing, it can be seen that the present system provides for the mixing of first and second signals, namely a local oscillation and a received signal in the presence of a third signal, such as a transmitter sampling signal injected for the purpose of automatic frequency control. It has been shown possible to use a single hybrid waveguide junction with appropriate mixer arms for the dual purposes of deriving a heterodyne received-signal output and a further signal that is a measure of drift of the intermediate frequency. It is to be expressly understood that, although a "rat-race" type of hybrid junction has been illustrated, enabling separate treatment of the sampling signal and the received signal, alternative waveguide connections will occur to those skilled in the art, as, and for example, a double magic-T waveguide junction.

Other useful features, changes in detail and various applications of the foregoing specific circuit will occur to those skilled in the art, without departing from the spirit of the invention as set forth in the appended claims. Accordingly these should be accorded such broad interpretation as is consistent with the spirit and scope of the invention.

What is claimed is:

1. A detector comprising a hybrid waveguide junction having two input arms and two output arms, means for impressing a first signal on one of said input arms, means for impressing second and third signals on the other of said input arms, a non-linear impedance in each of said output arms, said one input arm being arranged to apply said first signal to said output arms in mutually out-of-phase relationship, said other input arm being arranged to apply said second and third signals to said output arms in mutually in-phase relationship, a first output circuit connected to said impedances for parallel feed with respect to the heterodyned first signal, and a second output circuit connected to said impedances for push-pull feed with respect to the heterodyne of said second and third signals.

2. A detector comprising a hybrid waveguide junction having two input arms and two output arms, means for impressing a first signal on one of said input arms, means for impressing second and third signals on the other of said input arms, a non-linear impedance in each of said output arms, said one input arm being arranged to apply components of said first signal to said output arms in mutually out-of-phase relationship, said other input arm being arranged to apply components of said second and third signals to said output arms in mutually in-phase relationship, a first output circuit, a center tapped impedance connected to said impedances and coupled to said first output circuit, a second output circuit, and an impedance connected between the center-tap of the center-tapped impedance and said non-linear impedances and connected to energize said second output circuit.

3. A detector comprising a pair of non-linear resistive elements having input connections for applying components of first and second signals to said resistive elements in-phase and components of a third signal to said resistive elements out-of-phase, first and second output circuits, coupling means including a center-tapped impedance having its opposite ends connected to one terminal of each of said resistive elements and coupled to said first output circuit, and second output circuit connected between the opposite terminals of said elements and the center-tap of said impedance.

4. A combined automatic frequency control and heterodyne detector comprising a hybrid waveguide junction having two input arms and two output arms, means for impressing a received signal on one of said input arms, means for producing a locally generated signal, coupling means impressing said locally generated signal and a sampling signal on the other of said input arms, a non-linear impedance in each of said output arms, said one input arm being arranged to apply said received signal to said output arms in mutually out-of-phase relationship, said other input arm being arranged to apply said locally generated and sample signals to said output arms in mutually in-phase relationship, a heterodyne output circuit having push-pull input connections coupled to said impedance elements for deriving said received signal, and frequency-control means coupled to said impedance elements for parallel feed with respect to said sampling signal and arranged in controlling relation with respect to the oscillation-producing means.

5. In a combined frequency control and detector, a pair of non-linear resistive elements having input connection for applying first and second signals to said resistive elements in-phase and a third signal to said resistive elements out-of-phase, first and second output circuits, coupling means connecting said resistive elements to said first output circuit in parallel relationship with respect to the heterodyne of said first and second signals, further coupling means connecting said resistive elements to said second output circuit in parallel with respect to the heterodyne of said first and third signals, means for producing said first signal, and an automatic frequency control circuit responsive to said parallel heterodyne signal arranged in controlling relation to said first signal-producing means.

6. A mixer for separately combining a received signal and a transmitter sampling signal with a locally generated oscillation and for stabilizing that local oscillation, including a hybrid waveguide junction having a pair of input arms and a pair of output arms, a pair of non-linear resistive elements, one in each of the two output arms of said hybrid waveguide junction, said waveguide junction and the polarization of said resistive devices being such as to develop received signal components of a certain phase relationship at said non-linear elements and to develop local oscillation signal and transmitter sample signal components at said elements in a relative phase relationship opposite said certain phase relationship, a center-tapped impedance connected in push-pull between one terminal of each of said rectifiers, a further impedance between the center-tap and the remaining terminals of said non-linear resistive elements, local frequency generating means including a frequency control circuit connected to one of said impedances for control thereby, and a utilization circuit connected to the other of said impedances for energization thereby.

7. A mixer system in accordance with claim 6, including a pulse transmitter for generating the transmitter signal, and a pulse-modulator for controlling both the pulse transmitter and the frequency control circuit.

References Cited in the file of this patent

UNITED STATES PATENTS

| | | |
|---|---|---|
| 2,436,828 | Ring | Mar. 2, 1948 |
| 2,445,895 | Tyrrell | July 27, 1948 |
| 2,567,825 | Pound | Sept. 11, 1951 |
| 2,568,090 | Riblet | Sept. 18, 1951 |
| 2,666,134 | Dicke | Jan. 12, 1954 |